United States Patent Office 3,313,766
Patented Apr. 11, 1967

3,313,766
PROCESS FOR IMPROVING THE STORABILITY OF PHENOL RESOLS BY ADDING TRIOXANE
Guido Max Rudolf Lorentz, Post Espa, near Butzbach, Helmut Neises, Kelkheim, Taunus, and Rudolf Stroh, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Jan. 21, 1964, Ser. No. 339,114
Claims priority, application Germany, Jan. 22, 1963, F 38,819
3 Claims. (Cl. 260—45.8)

The present invention relates to a process for improving the storability of phenol resols.

Phenol resols have been widely used in industry. In particular, liquid phenolic resins have proved to be suitable binders for a variety of products. Liquid phenolic resols have the drawback, however, that they show signs of ageing after a relatively short time, beginning after about 15 days and becoming rather pronounced after about 30 days, the ageing being evidenced by a considerable increase of the viscosity. As the expert knows, such ageing is due to the fact that the phenol resols continue to condense or, more accurately, that the methylol groups of the resin molecules continue to react with the formation of ether.

A large number of processes have been proposed to reduce the ageing of phenol resols, that is further condensation during storage, without reducing the reactivity of the phenol resols, particularly their capability of cold-hardening within a short time. However, it has hitherto not been possible to find a satisfactory solution to this problem.

Now we have found that the storability of phenol resols can be improved and their tendency to ageing can be reduced by adding trioxan to the said resins. Such addition of trioxan not only improves the storability of phenol resols to a high extent but also considerably reduces their viscosity. The addition of trioxan, the cyclic trimer of formaldehyde, impairs neither the reactivity of phenol resols nor the mechanical properties of hardened phenol resols containing a filler or not. On the contrary, the said reactivity and mechanical properties are even improved to a certain degree.

The trioxan is added in such an amount that 100 parts by weight of the mixture of phenol resol and trioxan contain 1 to 25 parts by weight, advantageously 5 to 20 parts by weight, of trioxan.

The addition of trioxan to be made in accordance with the invention must not be confounded with the conventional additions of monomer formaldehyde as such, of paraformaldehyde or of hexamethylene triamine made to phenol resols, which have been known for a long time. Trioxan is a chemically independent, neutral, liquid substance which is resistant to alkalies and which, per se, does not react with phenol resols if the latter have a pH value of 7 or more. In a pH range below 7 trioxan is not stable in the long run.

The term "phenol resols" is used herein to mean products obtained by the reaction of aldehydes and phenols in an alkaline medium. The term "phenol" is here intended to mean phenol, substituted phenols such as alkyl phenols, for example, cresol and higher alkylated phenols up to phenols with higher alkyl radicals of up to 16 carbon atoms, and is also intended to include bisphenols and polyphenols. Exemplary of bisphenols are the reaction product of 1 mol acetone and 2 mols phenol, i.e., bis(4-hydroxyphenyl)dimethylmethane, reaction products of 2 mols phenol and 1 mol diene, or phenolaldehyde plastics formed under acid conditions which have been liquefied by subsequent condensation with formaldehyde in an alkaline medium.

As an aldehyde to be reacted with phenols to obtain phenolic resins, formeldehyde may advantageously be used. Alternatively, other aldehydes such as, for example, acetaldehyde and its homologs or acrolein and its homologs may be used. A condensation with furfural also yields valuable resins.

The phenol resols may be obtained by proceeding, for example, in the following manner: The phenol is dissolved in an appropriate alkali metal hydroxide, for example, aqueous or alcoholic sodium hydroxide solution, and then an aldehyde, for example formaldehyde, is added whereby so-called phenol-methylol compounds, also called phenolic alcohols, are formed. The phenol-methylol compounds may be converted, if desired, to viscous polycondensates by the addition of acid or a thermal aftertreatment, the methylol groups being reacted to form ether bonds with the separation of water. Besides containing ethers, these resins also contain a large number of free methylol groups which account for their instability. The further reaction of two methylol groups with one another with the formation of a methylol ether structure is associated with the splitting off of water so that separation of water is constantly observed on a phenol resol obtained according to the above scheme.

The molar ratio between phenol and aldehyde in the phenol resols is generally within the range of 1:1 to 1:3, the optimum ratio being about 1:1.5.

The resols which have been modified with trioxan by the process of the invention can be admixed with a higher proportion of filler than the unmodified resols. Like any phenol resol they are capable of cold-hardening under the action of acid.

The addition of trioxan to phenol resols in accordance with the invention thus has the following effects as will also be shown in the examples below:

(1) Reduction of the viscosity and prolongation of the storage life of liquid phenol resols, (2) Prolongation of the spreadable life of the liquid phenol resols which have been modified in accordance with the invention, used in admixture with hardeners and fillers, (3) Improvement of the mechanical values of phenol resols which have been improved in accordance with the invention, used in admixture with hardeners and fillers.

The following examples serve to illustrate the invention but they are not intended to limit it thereto, the parts being by weight.

EXAMPLE 1

The viscosity of various phenol resols which had been obtained from phenol and formaldehyde by the process described above, was determined in dependence on the storage time and with the addition of trioxan (trioxymethylene). The results ascertained are indicated in the following Table 1. The said table clearly shows the reduction of the viscosity and the increase of the storage life by the addition of trioxan. Especially, the stabilizing action of the trioxan addition also at elevated temperatures (storage at 50° C.) is remarkable. That stabilizing action enables the phenol resols to be used for a wider range of application than the known phenol resols not improved by the process of the invention.

Resin 1:

0.300 kg. sodium hydroxide solution of 50% strength was stirred for 24 hours under reflux in a flask with
1.650 kg. phenol and
2.025 kg. formaldehyde. After 24 hours
0.400 kg. hydrochloric acid of 30% strength was slowly added, whereupon the resin separated. The supernatant water was decanted and the resin was then washed with about 1.2 to 1.5 liters of water. The resin was then adjusted to a pH of 7.5 with a small amount of sodium hydroxide solution.

*Resin 2:*

The batch was the same as for resin 1, that is 0.300 kg. sodium hydroxide solution of 50% strength
1.650 kg. phenol but
2.700 kg. formaldehyde of 30% strength.

The resin was prepared in the same manner as resin 1.

*Resin 3:*

Resin 3 was a modified phenolic resin and contained

82% of phenolic resin 2
4% of epichlorhydrine
10% of furfural and
4% of dichloropropanol.

EXAMPLE 2

To 100 parts of a phenol resol of the composition indicated sub items (9) to (12) of the above Table 1 there was added in each case a powder consisting of 92 parts carbon powder of a grain size of 0 to 0.38 mm. and a hardener of 6 parts toluene sulfonic acid and 2 parts toluene sulfochloride, the powder being added in the amounts indicated in the following Table 2. The mixtures so obtained had the spreadable lives indicated in the following Table 2. The column "Shore hardness" of Table 2 indicates the hardness values determined on a Shore-D-hardness tester after 24 hours. The compressive strength of the individual mixtures was determined after a storage in air for 8 days (column "Compressive strength in the cold") and after a storage in air for 24 hours and then for 16 hours at 90° C. (column "Compressive strength after heat ageing").

TABLE 1

|  |  | Initial viscosity at 20° C. (cp.) | Viscosity after 30 days at 20° C. (cp.) | Viscosity after 50 days at 20° C. (cp.) | Viscosity after 20 days at 50° C. (cp.) |
|---|---|---|---|---|---|
| 1 | Phenolic resin 1 (molar ratio phenol:formaldehyde=1:1.1). | 1,440 | 2,987 | 6,330 | |
| 2 | 95 parts phenolic resin 1, 5 parts trioxan | 829 | 995 | 2,160 | |
| 3 | 90 parts phenolic resin 1, 10 parts trioxan | 515 | 672 | 779 | |
| 4 | 80 parts phenolic resin 1, 20 parts trioxan | 323 | 233 | 256 | |
| 5 | Phenolic resin 2 (molar ratio phenol:formaldehyde=1:1.5). | 590 | 1,470 | 3,320 | |
| 6 | 95 parts phenolic resin 2, 5 parts trioxan | 352 | 503 | 1,400 | |
| 7 | 90 parts phenolic resin 2, 10 parts trioxan | 253 | 301 | 430 | |
| 8 | 80 parts phenolic resin 2, 20 parts trioxan | 111 | 119 | 145 | |
| 9 | Modified phenolic resin according to Ex. 3 | 882 | 2,009 | 3,760 | |
| 10 | 95 parts modified phenolic resin, 5 parts trioxan. | 424 | 858 | 1,100 | |
| 11 | 90 parts modified phenolic resin, 10 parts trioxan. | 317 | 477 | 500 | |
| 12 | 80 parts modified phenolic resin, 20 parts trioxan. | 157 | 233 | 164 | |
| 13 | Modified phenolic resin as above | 882 | | | 175,000 |
| 14 | 95 parts modified phenolic resin, 5 parts trioxan. | 424 | | | 75,000 |
| 15 | 90 parts modified phenolic resin, 10 parts trioxan. | 317 | | | 31,400 |
| 16 | 80 parts modified phenolic resin, 20 parts trioxan. | 157 | | | 1,270 |

TABLE 2

| Mixture | Spreadable life | Shore hardness after 24 h., 20° C. | Compressive strength in the cold after 8 days, kg./cm. | Compressive strength after heat ageing, kg./cm. |
|---|---|---|---|---|
| 100 parts solution No. 9, 150 parts powder containing a hardener. | 55 min | 60 | 313 | 440 |
| 100 parts solution No. 10, 140 parts powder as above. | 75 min | 60 | 407 | 460 |
| 100 parts solution No. 11, 145 parts powder as above. | 75 min | 60 | 435 | 480 |
| 100 parts solution No. 12, 190 parts powder as above. | 80 min | 60 | 327 | 268 |

We claim:

1. Phenol-aldehyde resol containing trioxan as an anti-ageing substance.

2. A composition consisting essentially of 75 to 99 parts by weight phenol-aldehyde resol and 25 to 1 parts by weight trioxan.

3. A composition consisting essentially of 80 to 95 parts by weight phenol-aldehyde resol and 20 to 5 parts by weight trioxan.

References Cited by the Examiner

UNITED STATES PATENTS 2,414,934   1/1947   Denny _____ 260—88
2,848,436   8/1958   Christenson _____ 260—45.7

LEON J. BERCOVITZ, *Primary Examiner.*

M. J. WELSH, *Assistant Examiner.*